United States Patent [19]

Rossmann

[11] 4,405,205

[45] Sep. 20, 1983

[54] ADJUSTABLE MECHANISM FOR A PHOTO OBJECTIVE

[75] Inventor: Dieter Rossmann, Aalen, Fed. Rep. of Germany

[73] Assignee: Carl Zeiss-Stiftung, Oberkochen, Fed. Rep. of Germany

[21] Appl. No.: 209,269

[22] Filed: Nov. 21, 1980

[30] Foreign Application Priority Data

Nov. 21, 1979 [DE] Fed. Rep. of Germany ....... 2946943

[51] Int. Cl.³ .............................................. G02B 7/04
[52] U.S. Cl. .................................. 350/255; 350/430
[58] Field of Search ....................... 350/255, 429, 430

[56] References Cited

U.S. PATENT DOCUMENTS

| 3,773,405 | 11/1973 | Sugano | 350/255 X |
| 3,862,797 | 1/1975 | Uesugi | 350/255 |
| 3,914,026 | 10/1975 | Kanno | 350/255 |
| 4,175,831 | 11/1979 | Ito | 350/255 |

FOREIGN PATENT DOCUMENTS

| 2227448 | 12/1972 | Fed. Rep. of Germany | 350/255 |
| 2339723 | 2/1974 | Fed. Rep. of Germany | 350/255 |

*Primary Examiner*—F. L. Evans
*Attorney, Agent, or Firm*—Hopgood, Calimafde, Kalil, Blaustein & Judlowe

[57] ABSTRACT

An adjustment device for a macrolens objective wherein a first lens group and a second lens group are axially displaceable is constructed so that the rotary movement necessary to move the second lens group in an axial direction is derived from the axial movement of the first lens group. There is no direct connection between the first lens holder and a stationary housing. The first lens group holder is threadably attached to the focusing ring which in turn is threadably attached to the lens housing by threads of equal but opposite pitch. The axial movement of the first lens holder is transmitted to the second lens holder, preferably, by an intermediate ring having internally threaded helical grooves. The first lens holder is engaged in the helical grooves of the intermediate ring, which ring in turn is engaged in internally threaded helical grooves of the same pitch of a cylindrical portion of the second lens holder. The rotary movement of the cylindrical portion causes the second lens holder to move axially relative to the lens housing to which it is threadably engaged.

9 Claims, 2 Drawing Figures

ADJUSTABLE MECHANISM FOR A PHOTO OBJECTIVE

BACKGROUND OF THE INVENTION

1. Field of the Invention

The present invention relates to an adjustment device for photographic lenses, particularly macrolenses of large focusing range.

2. Prior Art

In such lenses, two lens groups are displaced for the distance setting in order to assure good correction of the imaging errors of the lens over the entire focusing range. In this connection, a first lens group, which is generally identified as the front lens group, carries out a relatively large adjustment movement while a second lens group, the so-called floating group, carries out a smaller displacement.

It is common in known macro-objectives for the axial adjustment movement of both lens groups to be derived directly from the turning movement of the focusing ring. Thus it is known, for instance, from West German Pat. No. 22 27 448 and from West German Unexamined Application for Patent No. 23 39 723, to couple the front lens holder and the focusing ring which is in threaded engagement with the housing directly to each other and to drive a linearly-guided floating group via a second thread or a helical groove.

In this way, however, only relatively small adjustment movements of the front lens group can be affected. Furthermore, a front portion of the lens which is turnable upon focusing excludes the use of certain filter attachments and, thus, limits the possibilities of use for the lens.

Some macrolenses such as those which are, for instance, described in U.S. Pat. No. 3,914,026 therefore have a linearly guided front lens group which is coupled, via a first thread, with the focusing ring which in its turn is in engagement with the housing by means of a second thread. Upon turning of the focusing ring, the axial movement of the front lens group corresponds to the total of the pitches of the two threads. The floating group is also linearly guided and is driven by the focusing ring in the same manner.

In such lenses, however, the rotation of the focusing ring must be limited to an amount which is definitely less than 360° in order not to endanger the mechanical stability of the lens. This limitation in the adjustment motion has the result that the macrolens described in U.S. Pat. No. 3,914,026 can be adjusted continuously only down to an imaging scale of 1:2 and that an additional intermediate ring with an expensive mechanism of transmission to the floating group is required for the range between 1:2 and 1.

SUMMARY OF THE INVENTION

The object of the present invention is to create an adjustment device for macrolenses which permits continuous distance setting over a large focusing range.

Starting from a standard macrolens, the invention achieves this purpose in such a manner that the holder of the second lens group is in threaded engagement with the lens housing and that mechanical transmission means are provided in order to derive from the axial movement of the first lens group the rotary movement necessary for the axial displacement of the second lens group relative to the housing.

The advantage of the invention resides in the fact that it is not necessary to have direct coupling between the focusing ring and the floating group, the turnability of which had been limited to a range of less than 360° as a result of the linear guidance between front lens group and lens housing. Thus, the focusing ring of the present invention can effect several revolutions without difficulty whereby sensitive and accurate distance-setting over a very large range is possible.

It is advantageous to derive the turning movement of the floating group via helical grooves from the axial movement of the front lens group. The pitch of the groove can easily be selected in such a manner that the desired ratio of movement of the two lens groups is obtained without the necessity of using expensive special threads. Non-linear movements of the floating group can also be easily obtained by selection of the pitch.

It is furthermore advisable to derive the turning movement via an axially and rotationally movable cylinder which is coupled with the holder of the linearly-guided front lens group and with the holder of the floating group by helical grooves of the same pitch. Thus, by the nesting of two grooves one within the other, the length of the helical groove which corresponds to the large adjustment range between the linearly-guided front lens group and the floating group can be reduced so that the entire lens housing can be of very compact construction.

For the best possible ratio between adjustment range and structural length, the focusing ring should be in a first threaded engagement with the lens housing and the linearly-guided front lens group should be in another threaded engagement of identical but opposite pitch with the focusing ring.

The three components (lens housing, front lens holder, and focusing ring) can then be nested within one another in such a manner that upon focusing in the close-range there takes place a change in length of the lens to more than twice the length of the components which corresponds essentially to the length of the entire lens in the state of focus at infinity.

In this case, it is advisable to effect the linear guidance of the front lens group by means of an intermediate ring which is movable axially relative to the front lens group and to the lens housing so as to assure a positive connection between the housing and the front lens group over the entire focusing range.

BRIEF DESCRIPTION OF THE DRAWING

One illustrative embodiment of the present invention will now be explained in detail with reference to FIGS. 1 and 2 of the accompanying drawing, in which.

DETAILED DESCRIPTION

Figure 1:
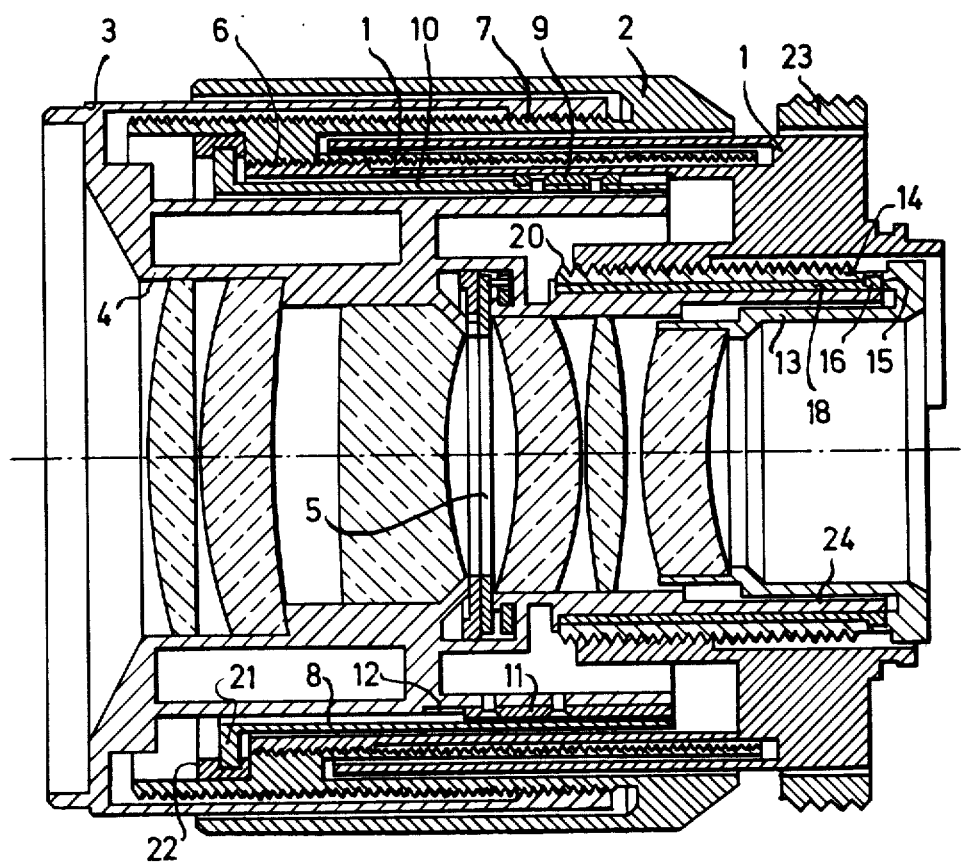
FIG. 1 is a diagrammatic longitudinal section through a macrolens adjustment device in accordance with the invention.

The macrolens shown in FIG. 1 has a housing 1 which is surrounded by a focusing ring 2 which is coupled with the housing 1 via a thread 6.

The front lens holder 4 is screwed by a thread 7 of opposite but identical pitch into the focusing ring 2 and is guided linearly with respect to the housing 1. Upon the turning of focusing ring 2, front lens holder 4 thus carries out an axial movement with respect to the housing 1 and moves in this connection over the coupled path in the same way as focusing ring 2.

The linear guidance of front lens holder 4 is effected by a rail 11 which slides in the axial groove 12 of a ring 8. The ring 8, in its turn, slides by means of a rail 9 in an axial groove 10 of housing 1. Upon focusing, ring 8 is carried along axially by focusing ring 2. For this purpose focusing ring 2 has a groove ring 22 into which the part 21 of the ring 8 extends.

In front lens holder 4 there is arranged an iris diaphragm 5 which is coupled with the preselection ring 23 by setting means, not shown in detail.

Front lens holder 4 also has a cylindrical part 24 which surrounds the holder 13 of the floating group in one end position of the focusing range. The holder 13 of the floating group in its turn is connected with a cylinder 14 which is in threaded engagement with lens housing 1 via thread 20.

Figure 2:
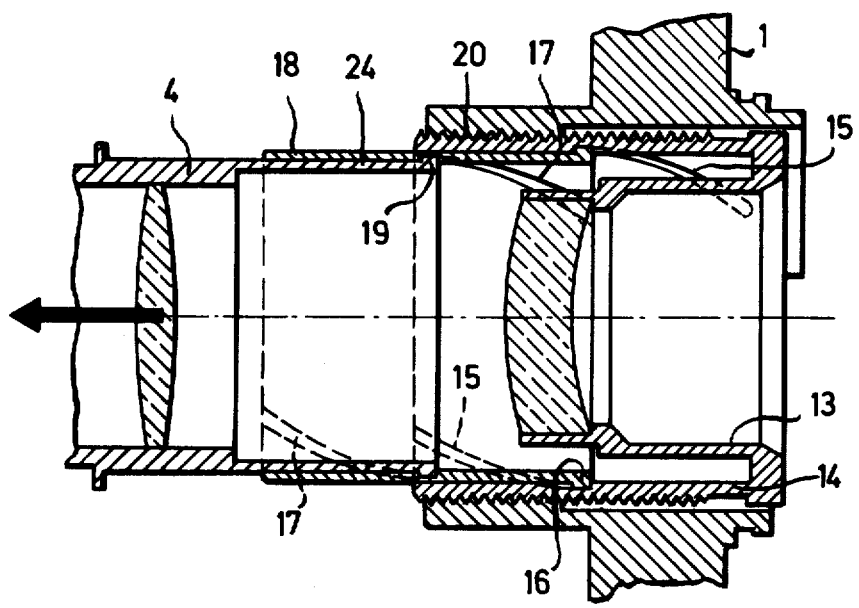
FIG. 2 is a diagram of the drive of the floating group by the front-lens group in the lens of FIG. 1.

The drive of the floating group will be explained in further detail with reference to FIG. 2 wherein corresponding parts have the same reference numerals in FIG. 1.

Upon an axial movement of front lens holder 4 and thus of cylindrical part 24, two blocks 19 which engage into helical grooves 17 of an intermediate ring 18 place said ring into a partially turning and partially axial movement. This movement is transmitted to the cylinder 14 connected with floating group holder 13 by means of two blocks 16 which are arranged in ring 18 and travel in helical grooves 15 in cylinder 14 of the same pitch as grooves 17. Thus, cylinder 14 carries out a turning movement which is unambiguously determined by the axial displacement of part 24 of front lens holder 4 and the pitch of groove paths 15 and 17; as a result of which movement, the floating group is moved axially relative to housing 1 via thread 20.

The condition of movement of intermediate ring 18 depends on the friction of the groove engagement with the parts 24 and 14 and is immaterial for the function of the transmission of the motion.

Of course, intermediate ring 18 can be dispensed with entirely if the front lens group is designed only for small focusing strokes or if no importance is placed on a compact construction of the lens. In such case, blocks 19 are to be brought directly into engagement with the grooves 15.

It is to be understood that the above-described example is merely illustrative of the many specific embodiments which can be devised to represent application of the principles of the invention. Numerous and varied arrangements can be devised by those skilled in the art without departing from the spirit and scope of the invention. In particular, other means of transmission for deriving turning movement from the axial movement of the front lens group are possible. For instance, instead of intermediate ring 18 there may be used a spindle of large pitch which engages in the manner of a drill bit into corresponding sleeves which are connected with the front lens holder or are coupled in a turnable manner with the floating group.

I claim:

1. An adjustment device for photogrpahic lenses comprising:
    a stationary lens housing;
    a focusing ring being threadably engaged with said lens housing by threads of a first pitch;
    a first lens holder for a first lens group, said first lens holder being threadably engaged with said focusing ring by threads of equal but opposite pitch to said first pitch;
    a second lens holder for a second lens group, said second lens holder having a cylindrical portion with a first set of internally threaded helical grooves of a second pitch, said second lens holder being threadably attached to said housing; and
    an intermediate ring having a second set of internally threaded helical grooves of said second pitch, said first lens holder being engaged in said second set of helical grooves, said intermediate ring being engaged in said first set of helical grooves in said second lens holder such that axial and rotational movement of said intermediate ring rotates said second lens holder to cause axial displacement of said second lens holder relative to said housing.

2. The adjustment device of claim 1 further comprising means for linearly guiding said first and second lens group, said linearly guiding means comprising:
    a cylinder which moves in an axial direction in an opening between said lens housing and said first lens holder, said cylinder being coupled to said first lens holder which is coupled to said focusing ring to provide axial movement of said second lens group.

3. The adjustment device of claim 2 wherein said cylinder contains an axial groove in which a rail attached to said first lens holder is slidably attached and a rail which is slidably attached to a groove in said lens housing.

4. The adjustment device of claim 1 wherein said focusing ring, lens housing, and first lens holder are fittable one within the other;
    said focusing ring comprising a cylindrical body being internally threaded and having first and second hollow concentric portions therein with external openings on opposing ends of said body;
    a portion of said first lens holder being adapted to be inserted in said first hollow portion and threadably engaged therewith and a portion of said lens housing being adapted to be inserted in said second hollow portion; and
    another portion of said lens housing being threadably engaged with said internal threads.

5. An adjustment device for photographic lenses, particularly for lenses of large focusing range, comprising;
    a lens housing;
    a rotatable focusing ring;
    first and second lens groups having first and second holders respectively, said first and second lens groups being axially displaceable for focusing;
    said first lens group being linearly guided in said lens housing and being driven by said rotatable focusing ring;
    said holder of said second group being in threaded engagement with said lens housing so that it is rotatable with respect to said housing; and
    mechanical coupling means for transforming the axial movement of said first lens group into rotation of said second lens group for the axial displacement of said second lens group.

6. The adjustment device as claimed in claim 5 wherein said mechanical coupling means include at least one helical groove, said first and second lens groups being in engagement with each other via said at least one helical groove.

7. The adjustment device as claimed in claim 6 wherein said mechanical coupling means comprise:

a cylinder which is rotatable and axially displaceable with respect to said first and second lens groups, said holder of said second lens group including first helical grooves and said cylinder including second helical grooves of equal pitch, said first lens holder being in engagement with said second helical grooves of said cylinder and said cylinder being in engagement with said first helical grooves of said second lens group.

8. The adjustment device as claimed in claim 5 wherein said focusing ring is in a first threaded engagement with said lens housing and said first holder of said first lens group is in a second threaded engagement, of equal but opposite pitch, with said focusing ring.

9. The adjustment device as claimed in claim 8 further including a cylinder displaceable solely in an axial direction being disposed between said holder of said first lens group and said lens housing.

* * * * *